United States Patent [19]

Bird

[11] Patent Number: 5,692,122

[45] Date of Patent: Nov. 25, 1997

[54] GENERATION OF RANDOM CONVERSATION TESTCASES

[75] Inventor: David L. Bird, Eastleigh, England

[73] Assignee: International Business Machines Corporation, Armonk, N.Y.

[21] Appl. No.: 476,088

[22] Filed: Jun. 7, 1995

Related U.S. Application Data

[63] Continuation of Ser. No. 169,091, Dec. 17, 1993, abandoned.

[30] Foreign Application Priority Data

Mar. 30, 1993 [GB] United Kingdom .................. 9306661

[51] Int. Cl.[6] .................................................. G06F 11/30
[52] U.S. Cl. .................................................. 395/183.14
[58] Field of Search .................. 395/183.14; 364/267, 364/267.4, 267.8, 579, 580

[56] References Cited

U.S. PATENT DOCUMENTS

| | | | |
|---|---|---|---|
| 4,437,184 | 3/1984 | Cork et al. | 371/19 |
| 4,595,981 | 6/1986 | Leung | 364/300 |
| 4,617,663 | 10/1986 | Lake et al. | 371/25 |
| 4,742,467 | 5/1988 | Messerich et al. | 364/200 |
| 4,797,885 | 1/1989 | Orimo et al. | 371/19 |
| 4,953,096 | 8/1990 | Wachi et al. | 364/550 |
| 5,335,342 | 8/1994 | Pope et al. | 395/575 |
| 5,357,452 | 10/1994 | Pid-Di-Savoia et al. | 364/579 |
| 5,359,546 | 10/1994 | Hayes et al. | 364/579 |

*Primary Examiner*—Robert W. Beusoliel, Jr.
*Assistant Examiner*—Stephen C. Elmore
*Attorney, Agent, or Firm*—William A. Kinnaman, Jr.

[57] ABSTRACT

A method of generating pairs of random interprogram conversation testcases is provided in which conversation statements are selected with which to construct the testcases in dependence on what statements are permitted for the predicted current conversation states of the testcases. The effect of each statement that is added to the testcases on the states of the testcases at eventual execution is predicted from predefined state tables for particular conversation protocols. As each conversation-type statement is added to a testcase, it is determined whether matching statements must be added to the other testcase and, if so, these matching statements are randomly generated in the same way. Self-checking code is added to the testcases to check correct execution. The method is particularly suitable for testing the support of asynchronous conversations between transaction processing programs running in different CICS systems.

6 Claims, 7 Drawing Sheets

| COMMAND ISSUED | EIB FLAG RETURNED | STATE OF THE CONVERSATION | | |
|---|---|---|---|---|
| | | ALLOCATED STATE1 | SEND STATE2 | PEND-RECEIVE STATE3 |
| CONNECT PROCESS | EIBERR +EIBFREE | 12 | Ab | Ab |
| CONNECT PROCESS | x | 2 | Ab | Ab |
| EXTRACT PROCESS | x | = | = | = |
| EXTRACT ATTRIBUTES | x | = | = | = |
| SEND (ANY VALID FORM) | EIBERR +EIBFREE | Ab | 12 | Ab |
| SEND (ANY VALID FORM) | EIBERR | Ab | 5 | Ab |
| SEND INVITE WAIT | x | Ab | 5 | Ab |
| SEND INVITE | x | Ab | 3 | Ab |
| SEND LAST WAIT | x | Ab | 12 | Ab |
| SEND LAST | x | Ab | 4 | Ab |
| SEND WAIT | x | Ab | = | Ab |
| SEND | x | Ab | = | Ab |
| RECEIVE | EIBERR +EIBFREE | Ab | 12 | 12 |
| RECEIVE | EIBERR | Ab | 5 | 5 |
| RECEIVE | EIBERR | Ab | 12 | 12 |
| RECEIVE | EIBRECV | Ab | 5 | 5 |
| RECEIVE NOTRUNCATE | EIBCOMPL | Ab | 5 | 5 |
| RECEIVE | x | Ab | = | 2 |
| CONVERSE | EIBERR +EIBFREE | Ab | 12 | 12 |
| CONVERSE | EIBERR | Ab | 5 | 5 |
| CONVERSE | EIBFREE | Ab | 12 | 12 |
| CONVERSE | EIBRECV | Ab | 5 | 5 |
| CONVERSE NOTRUNCATE | EIBCOMPL | Ab | 5 | 5 |
| CONVERSE | x | Ab | = | 2 |
| ISSUE ERROR | EIBFREE | Ab | 12 | 12 |
| ISSUE ERROR | x | Ab | = | 2 |
| ISSUE ABEND | x | Ab | 12 | 12 |
| ISSUE SIGNAL | x | Ab | = | = |
| WAIT CONVID | x | Ab | = | 5 |
| FREE | x | END | END | Ab |

FIG.2A

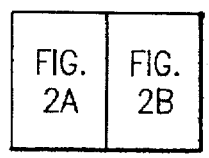

FIG.2

Prior Art

| PEND-FREE STATE4 | RECEIVE STATE5 | FREE STATE12 | COMMAND RETURNS |
|---|---|---|---|
| Ab | Ab | Ab | IMMEDIATELY |
| Ab | Ab | Ab | IMMEDIATELY |
| = | = | = | IMMEDIATELY |
| = | = | = | IMMEDIATELY |
| Ab | Ab | Ab | AFTER ERROR DETECTED |
| Ab | Ab | Ab | AFTER ERROR DETECTED |
| Ab | Ab | Ab | AFTER DATA FLOWS |
| Ab | Ab | Ab | AFTER DATA BUFFERED |
| Ab | Ab | Ab | AFTER DATA FLOWS |
| Ab | Ab | Ab | AFTER DATA BUFFERED |
| Ab | Ab | Ab | AFTER DATA FLOWS |
| Ab | Ab | Ab | AFTER DATA BUFFERED |
| Ab | 12 | Ab | AFTER ERROR DETECTED |
| Ab | = | Ab | AFTER ERROR DETECTED |
| Ab | 12 | Ab | AFTER ERROR DETECTED |
| Ab | = | Ab | WHEN DATA AVAILABLE |
| Ab | = | Ab | WHEN DATA AVAILABLE |
| Ab | 2 | Ab | WHEN DATA AVAILABLE |
| Ab | 12 | Ab | AFTER ERROR DETECTED |
| Ab | = | Ab | AFTER ERROR DETECTED |
| Ab | 12 | Ab | AFTER ERROR DETECTED |
| Ab | = | Ab | WHEN DATA AVAILABLE |
| Ab | = | Ab | WHEN DATA AVAILABLE |
| Ab | 2 | Ab | WHEN DATA AVAILABLE |
| Ab | 12 | Ab | AFTER RESPONSE FROM PARTNER |
| Ab | 2 | Ab | AFTER RESPONSE FROM PARTNER |
| 12 | 12 | Ab | IMMEDIATELY |
| Ab | = | Ab | IMMEDIATELY |
| 12 | Ab | Ab | IMMEDIATELY |
| END | Ab | END | IMMEDIATELY |

FIG.2B

SAMPLE CODE ADDED TO THE FRONT-END TESTCASE:

| 28. CONVERSE (SEND + RECEIVE) WITH THE BACK-END |
|---|

| | |
|---|---|
| CALL TRACK('28','CONVERSE, APPC,'); | DISPLAYS TRACKING INFORMATION |
| DATA20='8&<={IC'; | CREATES A STRING OF RANDOM DATA |
| EXEC CICS CONVERSE | ADDS THE CONVERSE COMMAND |
|     CONVID(SESSNAME) | IDENTIFIES THE CONVERSATION NAME |
|     FROM(DATA20) | SPECIFIES DATA TO BE SENT |
|     FROMLENGTH(7) | SPECIFIES LENGTH OF DATA TO BE SENT |
|     INTO(DATA20) | SPECIFIES DATA TO BE RECEIVED |
|     TOLENGTH(HALFARR(2)) | SPECIFIES LENGTH OF DATA TO BE RECEIVED |
|     MAXFLENGTH(20)) | MAXIMUM PERMITTED LENGTH OF DATA |
|     STATE(FULLARR(1)) | FRONT-END STATE PREDICTION ON EXIT |
| ; | FROM CONVERSE |

| (REMOTE) 29. RECEIVE DATA FROM FRONT-END, APPC |
|---|

CALL TRACK('29','RECEIVE(REMOTE), APPC,');[DISPLAYS TRACKING INFO FOR BACK-END]

| (REMOTE) 30. SEND ISSUED AT BACK-END, APPC |
|---|

CALL TRACK('30','SEND.APPC(REMOTE),');[DISPLAY TRACKING INFO FOR BACK-END]

| (REMOTE) 31. SEND CONFIRM (PIGGY-BACK), APPC |
|---|

CALL TRACK('31','SEND CONFIRM(PIGGY-BACK)APPC(REMOTE),');
                                          [DISPLAYS TRACKING FOR BACK-END]

| AFTER REMOTE SEND, CHECK RETURNED FIELDS ON CONVERSE |
|---|

| SELF-CHECKING CODE |
|---|

IF HALFARR(2)¬=14 THEN CALL ERROR(46); [INCORRECT LENGTH RETURNED]
IF SUBSTR(DATA20, ,14)¬='C=C C{)/=?C&&!'THEN CALL ERROR (47);

[INCORRECT DATA RECEIVED FROM BACK-END]

IF FULLARR(1)¬=83 THEN CALL ERROR(48); [STATE SHOULD BE 'CONFIRM-RECEIVE']

FIG.5

SAMPLE CODE ADDED TO THE BACK-END TESTCASE:

29. RECEIVE DATA FROM FRONT-END, APPC

```
EXEC CICS RECEIVE              ADDS THE RECEIVE COMMAND
    INTO(DATA20)               SPECIFIES DATA TO BE RECEIVED
    LENGTH(HALFARR(1))         SPECIFIES LENGTH OF DATA TO BE RECEIVED
    STATE(FULLAARR(1))         BACK-END STATE PREDICTION
    MAXLENGTH(20)              MAXIMUM PERMITTED LENGTH
```

SELF-CHECKING CODE

```
IF HALFARR(1)¬=7 THEN CALL ERROR(41); [INCORRECT LENGTH RETURNED]
IF SUBSTR(DATA20,1,7)¬='8&<={IC' THEN CALL ERROR(42);
                                 [INCORRECT DATA RECEIVED FROM FRONT-END]
IF FULLARR(1)¬=90 THEN CALL ERROR(43); [STATE SHOULD BE 'SEND']
```

30. SEND ISSUED AT BACK-END, APPC

```
DATA20='C=C C})/=?C&&!';       CREATES STRING OF RANDOM DATA TO SEND BACK
EXEC CICS SEND                 ADDS SEND COMMAND
    CONVID(SESSNAME)           IDENTIFIES CONVERSATION NAME
    FROM(DATA20)               SPECIFIES DATA TO BE SENT
    LENGTH(14)                 SPECIFIES LENGTH OF DATA TO BE SENT
    STATE(FULLARR(1))          BACK-END STATE PREDICTION
    ;
```

SELF-CHECKING CODE

```
IF FULLARR(1)¬=90 THEN CALL ERROR(44); [STATE SHOULD BE 'SEND']
```

31. SEND CONFIRM (PIGGY-BACK), APPC

```
EXEC CICS SEND
    CONVID(SESSNAME)           [ADDS FURTHER SEND COMMAND]
    CONFIRM
    STATE(FULLARR(1))          [BACK-END STATE PREDICTION]
```

SELF-CHECKING CODE

```
IF FULLARR(1)¬=88 THEN CALL ERROR(45); [STATE SHOULD BE 'RECEIVE']
```

FIG.6

GENERATION OF RANDOM CONVERSATION TESTCASES

This application is a continuation of application Ser. No. 08/169,091, filed Dec. 17, 1993, now abandoned.

BACKGROUND OF THE INVENTION

1. Field of the Invention

The present invention relates to automatic generation of random testcase programs for testing the operation of other computer programs, and more particularly to a random testcase generator for testing computer programs which support asynchronous interprogram conversations.

2. Description of the Related Art

The development of a large-scale computer program requires extensive functional testing of particular features of the program in various combinations in order to ensure that a fully developed program operates according to its desired specification. A large quantity of test material is required to ensure adequate test coverage, usually in the form of executable "testcases". Where the program to be tested is an operating system program which executes application programs, the testcases will themselves be application programs. Each testcase program would generally take a considerable time to write by hand and only represents one possible combination of the features under test. In order to generate the required large quantity of test material in a reasonable period of time and at reasonable cost, it is therefore desirable for random testcases to be generated by a computer program wherever possible.

Generating a testcase by purely random selection of commands and variables would invariably result in an invalid piece of code, so it is necessary for the "random" selection to include certain controls. GB-A-1479122 describes a testcase generator suitable for testing compilers of a programming language such as PL/1, which includes prediction of the result of execution of each statement of a testcase as the statement is generated in accordance with the rules of the predetermined computer language. Any generated instruction that would cause an unwanted interrupt during execution of the testcase is rejected and another is generated. Consequently, the whole of the generated testcase program is certain to be executable. The testcase generator of GB-A-1479122 also includes error-checking code, for checking both the flow of program execution and the calculated values of the variables changed during the operation of each testcase statement against their predicted values, when the testcase program is executed. Thus, it has been shown in GB-A-1479122 that a testcase generator desirably creates the text of a testcase program which includes certain random statements, predicts the eventual execution of the statements, and then self-checks the result of execution of the statements when the program under test is run. The basic structure of a testcase generator according to GB-A-1479122 is a loop. Each time around the loop the generator randomly selects the next statement to be added to the testcase and then calls a generator subroutine which is responsible for creating a random example of that statement. Each subroutine has the three tasks of creating the text of the random example, predicting its execution and, where possible, ensuring self-checking of correct execution.

EP-A-0052684 describes the extension of testcase generator concepts to the testing of a digital data display system. In such a system, the results of the run of a testcase would generally not appear as a series of error messages (as they would in compiler testing) but instead most error types that could occur would result in incorrect data being displayed at a terminal. The desirable function of self-checking is therefore difficult to achieve in graphics testing; but in EP-A-0052684 this was achieved by means of the testcases including marker symbols arranged to appear at the predicted end-points of each piece of random graphics. An error condition is indicated if the marker symbol and the end-points do not coincide.

Random testcase generators are of maximum value in the testing of programs to which the input is machine-creatable and complex, with many variations and combinations of input commands and parameters being possible.

An online transaction processing support system which is in large part suitable for testing by the random testcase generation methods established for other products is the CICS (Customer Information Control System) program marketed by IBM and described in the booklet *CICS General Information* (GC33-0155-4) available from IBM. (CICS is a trademark, and IBM is a registered trademark, of International Business Machines Corporation.) CICS is a family of program products each of which runs under a different operating system and each of which is capable of controlling networks of thousands of terminals and handling transaction rates in the region of 100 per second. CICS also controls access to databases and files (resources). CICS provides an application programming interface (API) by means of which customers can write application programs to process transactions in their specific business environment. The API defines over 200 program instructions, some of which have many dozens of parameters. The characteristics which make CICS a suitable product for such testing are that the CICS programming language (API) is machine-creatable and is relatively complex and that most of the CICS function is suitable for self-checking.

However, not all of CICS can be fully tested by methods of testcase generation that are known in the art. In particular, CICS supports the function of asynchronous conversations between CICS "regions" within a single system and between remote CICS systems which may reside on different types of processor and run under different operating systems. The concepts of random testcase generation previously established do not provide a solution for the functional testing of computer programs which support conversations, and so cannot adequately be used to test the intercommunication function of CICS. Prior to the present invention, conversations (that is, the two-way exchange of information between a pair of programs) have accordingly been tested mainly by entering single commands into a test tool, one instance representing each end of the conversation—a method which is clearly more time-consuming and less effective than automatic testcase generation.

SUMMARY OF THE INVENTION

The present invention provides a method of generating testcase programs for a distributed computer system in which communication between remote processors or regions employs interprogram conversation statements according to a predetermined protocol which also defines conversation states of the partners in the conversation, the method comprising the steps of:

a) randomly generating an example of an interprogram conversation statement for one of the conversation partners which is valid for the current conversation state of that partner;

b) adding the statement to a first testcase program for that partner;

c) if any randomly generated statement for the first testcase programs requires a matching statement at the other end of the conversation according to said protocol, randomly generating an example of an interprogram communications statement for the other partner which is valid for the current conversation state of that partner;

d) adding the matching statement to a second testcase program for the other partner; and e) predicting for each generated interprogram conversation statement any changes of state to said conversation partners that will occur on execution of the respective generated statements prior to generation of each such subsequent statement, whereby the validity of subsequent statements can be predetermined.

The present invention thus extends the acknowledged benefits of automatic testcase generation to the area of interprogram data communications functions and in particular to asynchronous conversations between program pairs.

Preferably, the method of the invention is also capable of generating nonconversational program statements randomly after an initial random selection of the statement type as being either interprogram conversation or nonconversational.

The random steps are preferably repeated until a predetermined number of statements have been added to the testcase.

Preferably which one of the pair of testcases is the designated first testcase and which is the designated second testcase is constant for each repeat of the process. Assuming the first testcase represents the front-end of an interprogram conversation (i.e., is the program which initiates the conversation) and the second testcase represents the back-end (i.e., the front-end's conversation partner), control of the conversation may at different times reside at either the front-end or the back-end of a generated block of code, but each block of code is created by first considering which statement type should be selected for a statement to be placed at the front-end.

The set of statements from which selection is made preferably comprises all statements of the selected type which are valid for the selected protocol and the predicted current state of the testcase. There is preferably a single large testcase generator subroutine which is called when the selected statement type is the set of interprogram conversation statements and which is responsible for putting out such statements which are permitted in the current state.

In the preferred method according to the present invention, checking statements are added to the testcases for checking correct execution of the randomly generated statements. It is desirable to associate self-checking code with as many executable statements as possible, to provide maximum test coverage, and to include tracking statements to enable fast locating of errors when they are detected.

As well as selecting the communication protocol for the testcase pairs, the system operator may also input other control information such as particular "weightings" on the statements that may be chosen by the generator, thereby to direct the testcase programs towards particular aspects of the system to be tested.

BRIEF DESCRIPTION OF THE DRAWINGS

The present invention will now be described in more detail, by way of example only, with reference to the accompanying drawings in which:

FIG. 2 is a state diagram showing the available commands and possible changes between states of an LU6.2 conversation at synchronization level 0 between two CICS systems.

FIG. 5 shows sample code added to the front-end testcase in accordance with the present invention.

FIG. 6 shows sample code added to the back-end testcase in accordance with the present invention.

DESCRIPTION OF THE PREFERRED EMBODIMENT

As has been mentioned above, a CICS system or region provides a number of intercommunication facilities with other CICS systems which allow processing to be split between intercommunicating systems and resources to be distributed between them. Of these facilities, only one, known as distributed transaction processing (DTP), allows two or more communicating application programs involved in transactions to run simultaneously in different systems and to pass data back and forth among themselves—that is, to carry on a conversation. The transaction programs are designed and coded specifically to communicate with each other, and in doing so to use the intersystem link with maximum efficiency. DTP is fully described in the publication *CICS/ESA Distributed Transaction Programming Guide V3R3* (Ref. No. SC33-0783-01), available from IBM.

Figure 1:
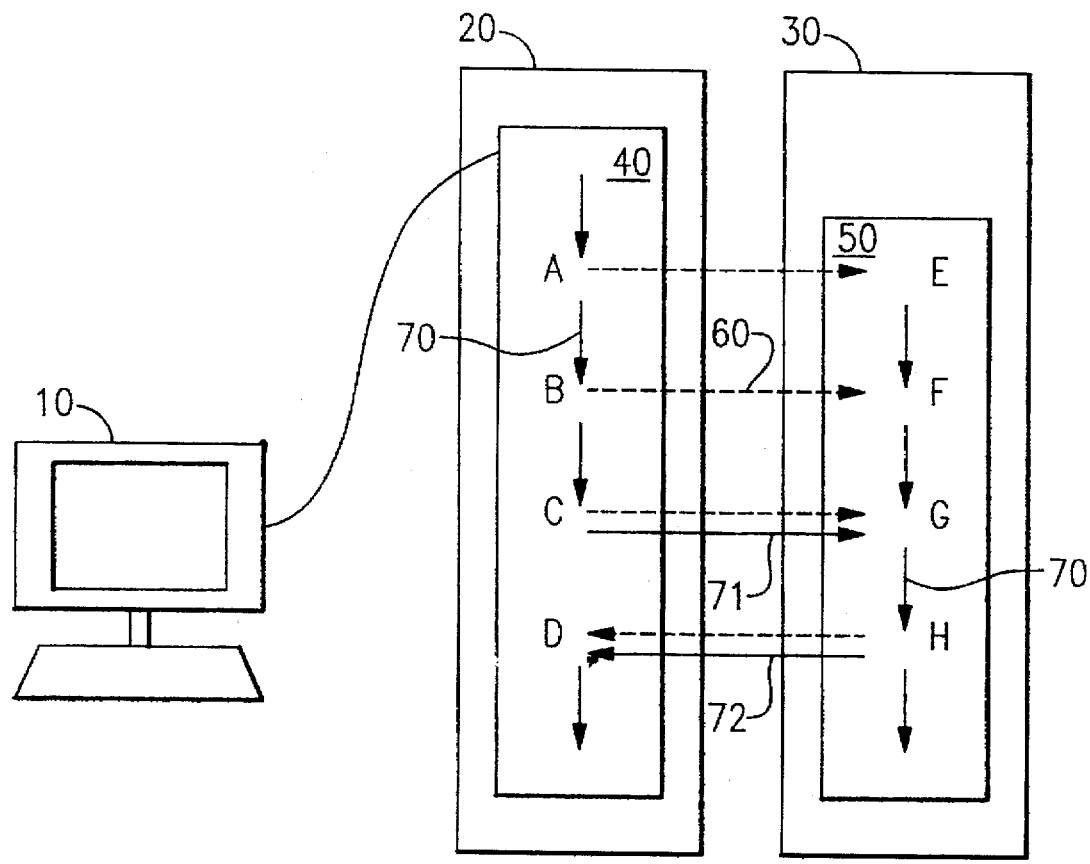
FIG. 1 is a schematic diagram showing two intercommunicating CICS systems.

Two CICS systems using DTP are shown in FIG. 1. A transaction processing program 40 (hereafter "a transaction") is initiated in a first CICS system 20, for example by the operator of a terminal 10 keying in a transaction identification. During its execution, the transaction 40 may ask the system 20 to establish a communication session with another CICS system 30. In the context of DTP, the transaction which initiates a conversation is known as the front-end transaction on that conversation. The transaction 40 may then send a message across a communication link established by the session, asking the second CICS system to start a new transaction. The second system 30 would then initiate a transaction processing program 50, this conversation partner to the front-end transaction being known as the back-end transaction. In FIG. 1 data flow is indicated by dashed arrows 60, whereas flow of control is indicated by solid arrows 70, 71 and 72.

The two transaction programs 40, 50 may now send and receive messages, including data as indicated by arrows 60, to and from each other. Between sending and receiving messages, they continue normal processing completely independently as indicated by arrow 70, i.e., the front-end transaction 40 and back-end transaction 50 may execute asynchronously. When the two transaction programs communicate, they do so according to established communications protocols according to which messages can consist of:

a) Data.

b) Agreements on how to proceed with communication or how to send it. For example, the first transaction 40 can tell the second transaction 50 when it may transmit messages across the session. At any time, both programs must know the state of their communication, and thus, what actions are allowed. At different times, either system may have actual control of the communication.

c) Agreements to make permanent (i.e., commit) all changes made up to that point. This allows the two programs to synchronize changes at times known as syncpoints. Syncpoints define the extent of logical units of work (LUWs).

d) Agreements between the two systems 20, 30 to cancel, rather than make permanent, changes to data made since a given point. Such a cancellation (or rollback) might occur because of uncertainty caused by failure of the application, the system, the communication path, or the data source.

Although the two transaction programs 40, 50 exist as independent units of work in their respective systems, they are designed to work as one. Of course, DTP is not limited to pairs of transactions. Many transactions may be chained together to distribute processing more widely across multiple systems.

In the above example, the two transactions 40, 50 are both CICS transactions. However, the transaction 50 invoked in the second system need not be, because a CICS program can establish sessions with non-CICS partners or with partners conforming to a different one of the protocols supported by CICS. The four protocols supported by CICS are LU6.2-APPC (Advanced Program-to-Program Communication), LU6.1, MROXM (Multi-Region Operation Cross Memory), and MROIRC (Multi-Region Operation Inter-Region Communication)—for a description of these see the above referenced *CICS/ESA Distributed Transaction Programming Guide V3R3*. Some CICS commands are permitted under one or more of these protocols but not permitted under the others.

Although several programs can be involved in a single distributed process, information transfer within the process is always between self-contained communication pairs of programs. The exchange of information between a pair of programs is called a conversation. During a conversation, both programs are active in sending data to and receiving data from each other. Each program which is a partner to the conversation is always in one of a number of defined conversation states. The states change as interprogram conversation statements are executed by the conversation partners. Certain CICS commands are permitted whereas others are prohibited in each of the different states; these are specified in the document SC33-0783-01 referred to above. The most complex of conversations are LU6.2 conversations and the generation of random testcases for these conversations according to the present invention incorporates the methods used for the other protocols. It is therefore only necessary to consider LU6.2 conversations to understand the present invention. However, the random testcase generator of the particular embodiment of the present invention herein described supports all four protocol types.

Fourteen conversation states have been defined for CICS DTP, the set of states possible for a conversation depending on the particular protocol and "synchronization level" (hereafter "sync level") used. The random testcase generator according to this embodiment of the present invention encompasses all fourteen states, along with all of the CICS commands that are valid in these states. Three different levels of synchronization (0, 1 and 2) are defined for conversations using the LU6.2-APPC protocol, as described in the aforementioned document *CICS/ESA Distributed Transaction Programming Guide V3R3*.

At sync level 0, there is no CICS support for synchronization of remote resources on connected systems. But it is still possible, under the control of the application, to achieve some degree of synchronization by interchanging data, using SEND and RECEIVE commands.

At sync level 1, special commands can be used for communication between the two conversation partners. One transaction can confirm the continued presence and readiness of the other. Both transactions are responsible for preserving the data integrity of recoverable resources by issuing syncpoint requests at the appropriate times.

At sync level 2, all syncpoint requests are automatically propagated across multiple systems. CICS implies a syncpoint when it starts a transaction; that is, it initiates logging of changes to recoverable resources, but no control flows take place. CICS takes a syncpoint when one of the transactions themselves can initiate syncpoint or rollback requests. However, a syncpoint or rollback request is propagated to another transaction only when the originating transaction is in conversation with the other transaction, and sync level 2 has been selected.

It should be noted that syncpoint and rollback are not limited to any one conversation within a transaction. They are propagated on every conversation currently active at sync level 2.

FIG. 2 is a table showing (in row 1) the conversation states which are defined, (column 1) the commands which may be issued for any given state and (columns 3 to 8) the consequent transitions between states in an LU6.2 conversation at sync level 0. Only seven states are possible at this sync level, including state 0, which is not shown in the table. Column 2 of the table shows flags returned by the remote application to the local application's EXEC interface control block (EIB). These flags are part of the data stream associated with each issued command. It is by means of these EIB flags that each conversation partner keeps track of events occurring at the remote partner. Symbols used in the table of FIG. 2 have the following meanings:

| Symbol | Meaning |
| --- | --- |
| x | The EIB flag is not relevant to transitions between states; |
| Ab | The command is not valid in this state; |
| = | Remains in current state; |
| End | End of conversation. |

Taking an example from the table, if the front-end transaction is in the state named RECEIVE (state 5), it can receive data from the back-end partner transaction. Issuing a "RECEIVE" command in this state will change the state of the front-end transaction to either SEND (state 2), FREE (state 12), or maintain the RECEIVE state, depending on the command previously issued at the back-end as indicated by an EIB flag returned by the back-end to the front-end. In each of these possible states, certain further commands may then be issued whereas others will be prohibited.

In practice a real-life application would test various flags in the EIB to determine which command was issued at the other end and consequently what action is now expected at this end. For example, as shown in row 5 of the table of FIG. 2, if a RECEIVE is being performed, then the EIBRECV flag set would imply that a further RECEIVE was expected (conversation partner remains in State 5); there would be no change in the direction of data flow. If EIBREVC was not set, the state would switch to SEND (conversation State 2).

Referring again to the communicating front-end and back-end transactions of FIG. 1, it was noted that the transactions may execute asynchronously. For example, starting from State 2, if SEND statements are issued at A and at B in FIG. 1 (so that E and F represent RECEIVE statements) and neither the EIBERR nor EIBFREE flags are set control will move, as indicated by arrow 70, from the first SEND to the second SEND independently of when the first RECEIVE statement is issued (at E) in the back-end 50. If C in FIG. 1 represents the issue of a SEND INVITE statement, this will switch the front-end to PEND-RECEIVE state (State 3). Note that the front-end's control for the conversation will stop in the middle of the subsequent RECEIVE statement (at D) until a return transmission is made from the back-end SEND statement (at H). In this example, control passes temporarily from the front-end 40 to the back-end 50 and back again, as illustrated by arrows 71 and 72.

Additional commands to those available at sync level 0 may be issued at each of the other LU6.2 sync levels but are not illustrated in FIG. 2. 14 conversation states are defined for sync level 2 (including the states CONFRECEIVE, CONFSEND, CONFFREE, SYNCRECEIVE, SYNCSEND, and SYNCFREE in addition to all of the states defined for sync level 0), whereas 10 states are defined for sync level 1. The principles of the progression of the conversations being dependent on what is permitted in the current state are nevertheless the same for all protocols. Examples given below are not limited to commands and states only available at sync level 0.

Figure 3:
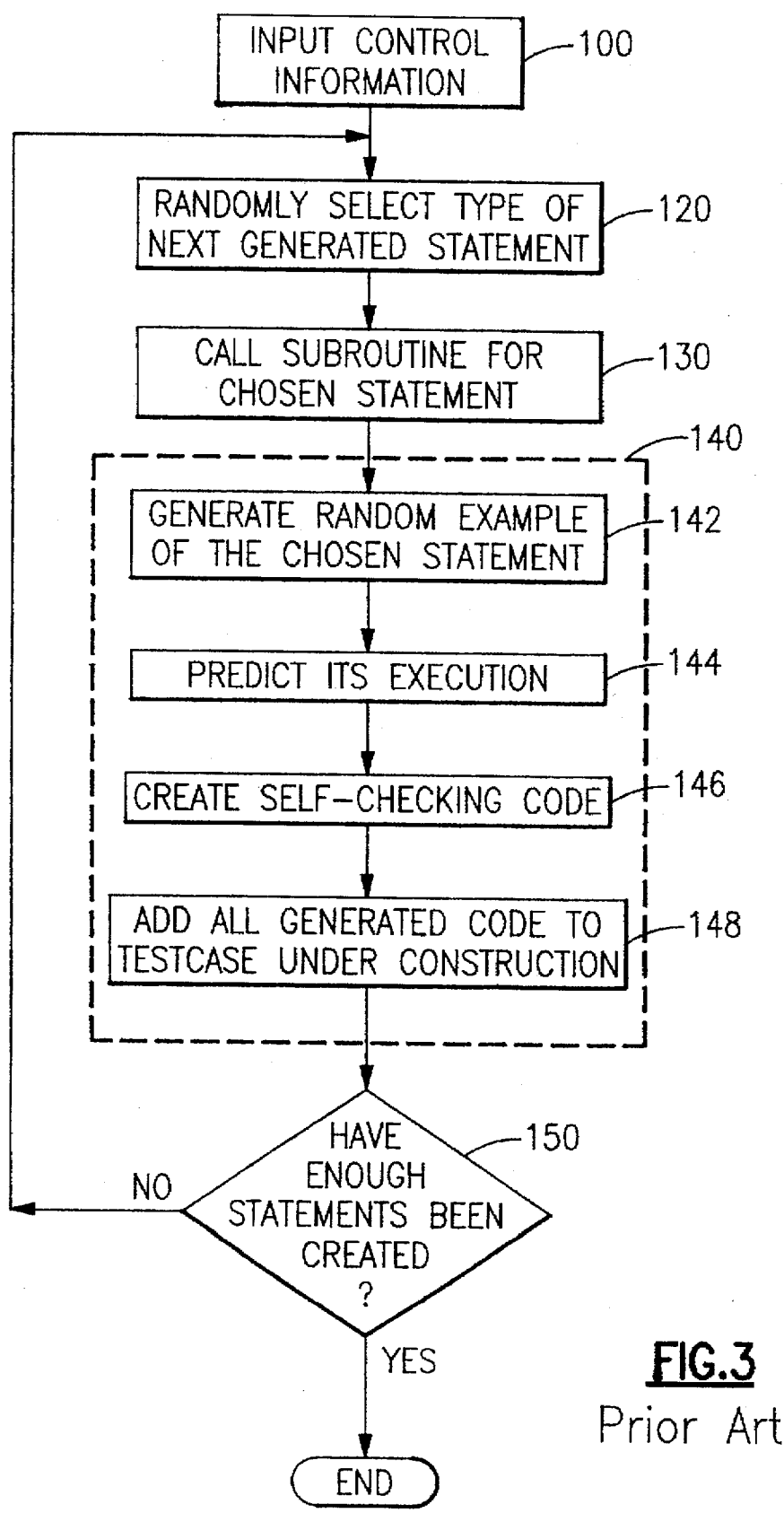
FIG. 3 is a flow diagram showing the principal steps of a known testcase generation method.

As discussed earlier, it is known for testcase generators to be designed as a loop. FIG. 3 shows the common process steps of a preferred embodiment of a testcase generator according to the prevent invention and of a conventional subroutine for generating single test cases. Initially the system operator must decide what particular aspects of the program under test are to be covered by a particular testcase. Control information is input at step 100, for example determining the testcase program protocol (relevant only to the conversational test case generator subroutine of FIG. 4), "weighting" parameters setting the types of files which may be accessed by the testcase, and an indication of the total number of instructions to appear in the testcase program. Numerical weights may be set for the required relative frequency of the different commands: by setting a large weight the tester can focus testcases on a particular feature. By setting a zero weight the tester can prohibit a particular feature from appearing at all (which may be desirable if, for example, the feature has not yet been coded by the product developers, or because there is a serious bug in that area that would halt all testcases).

The testcase generator then randomly selects at step 120 the type of the next statement which is to be generated. Previously set weights may control the relative frequencies with which different statements appear. Assuming the type of statement selected is not an interprogram conversation statement, a generator subroutine 140 is then called (step 130), which subroutine is specific to the selected individual statement type, to generate a random example of the chosen statement type. Each subroutine has the tasks of: creating (142) the text of the random example of the statement; predicting (144) the execution of this statement at run time; creating (146) self-checking code to ensure checking of correct execution; and then adding (148) all of the generated code to the testcase under construction. The checking may be indirect, for example examining the results of calls later in the testcase: if a WRITE instruction failed, a READ instruction later would send back the wrong data.

Following the addition of the generated code to the testcase, it is determined at step 150 whether enough statements have been created and added to the testcase. If not, then step 120 is repeated and a further randomly generated statement created until an adequate testcase has been generated.

The subroutine 140 is not suitable for testcase generation for intersystem conversations because it is necessary to construct two testcases (a front-end and a back-end) rather than one and because the command chosen might be illegal for the current state of the testcase. Testcase generation is extended to the function of intersystem communication according to the present invention and as illustrated in FIG. 4, by generating a plurality of testcases that are designed and developed to communicate with each other by selecting interprogram communication statements from those statements that are allowable in the predicted current states of the testcases.

Figure 4:
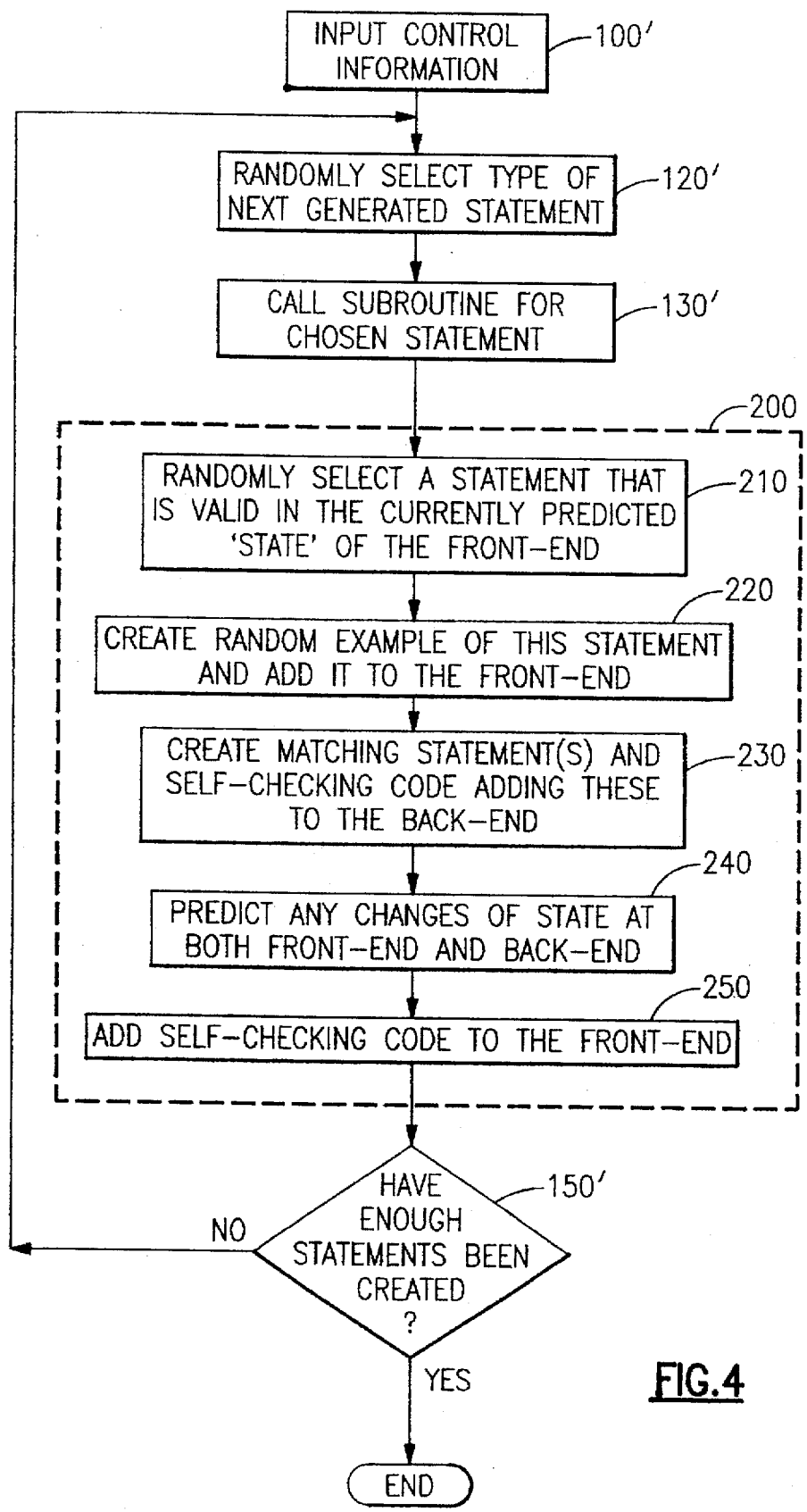
FIG. 4 is a flow diagram showing the steps in a method of generation of a pair of testcase programs according to an embodiment of the present invention.

A random testcase generator subroutine 200 for testing computer programs supporting interprogram conversations is similarly designed as a loop, and is shown in FIG. 4. The first three steps 100', 120' and 130' shown in FIG. 4 are the same as the initial three steps 100, 120, 130 shown in FIG. 3. The initial step of the testcase generation is thus the input 100' of control information. The preferred embodiment of the present invention can be run against various CICS platforms (e.g., MVS, VSE, OS/2, AIX) and for testing conversations from one platform to another (e.g., CICS OS/2 to CICS/ESA), so it is necessary to specify the platform for each testcase and the communications protocol. (CICS OS/2 and CICS/ESA are trademarks, and OS/2 and AIX are registered trademarks, of IBM Corporation.) The operator also specifies whether there are to be two CICS systems involved in the particular test run and whether there are to be two testcases. If the operator determines that there is to be only one CICS system (i.e., no communication between systems) or that there is to be only one testcase (suitable for testing function shipping between systems, for example, but not for testing interprogram conversations) then the testcase generation would proceed according to the conventional method steps of FIG. 3.

In the case illustrated by FIG. 4, it is envisaged that the result of random selection at step 120' is the statement type which is the set of all interprogram conversation statements including those listed in column 1 of FIG. 2. The testcase generator then calls at step 130' a subroutine 200 which is responsible for the generation of random examples of interprogram conversation statements. (Where the randomly selected type is other than the interprogram conversation type, generation of a random example of the statement and its addition to the testcase would be carried out by the subroutine 140 of FIG. 3.) However, if the chosen statement type happens to be an interprogram communication statement, the subroutine 200 performs a somewhat different set of tasks, as shown in FIG. 4.

The subroutine 200 firstly randomly selects (210) a statement or a plurality of statements that is/are valid in the predicted current "state" of the front-end testcase—that is the state that the front-end testcase can be predicted to be in (during eventual execution of the testcases) prior to this statement being executed. The prediction of states is possible because the various state transitions brought about by the different statements are fully defined for each protocol (see below). All references herein to states of the testcases during their generation are to the states which can be predicted at the time of execution. Which statements are valid and may therefore be selected is also clearly defined for all of the different CICS protocols (see the aforementioned document *CICS/ESA Distributed Transaction Programming Guide V3R3* for the state tables for LU6.2-APPC conversations, and FIG. 2 above for sync level 0 specifically).

The subroutine then creates at step 220 a random example of this statement (or these statements) and adds it (or them) to the front-end testcase. Creation of a random example entails determination of whether each of the randomly selected conversation statements has any data associated with it and, if so, creation of the data to be communicated by the statement. It is optional whether data length parameters are coded at all, but the length of outgoing data and/or the length of incoming data may be specified. Where these parameters are set, they can be used later for self-checking. It is beneficial for tracking statements to be added to the testcases in conjunction with the executable statements, so that any errors raised on eventual execution of the testcases can be located easily.

In most instances, one or more statements which match the statement added to the front-end are then created at step 230 for the back-end testcase, together with self-checking code, and these are added to the back-end testcase. There are, however, certain interprogram conversation statements which do not cause a data stream to pass across the conversation link and do not require matching statements at the other end of the conversation. There is a similar degree of randomness to that in the selection of the front-end statement(s) in this creation of matching statements for the back-end, each statement selection being constrained by what is permitted in the predicted current state of that testcase half (both of the testcase halves obey the rules of the particular connection protocol and sync level being used, and the same states apply to both). In a preferred implementation of the invention, front-end and back-end statements are added to the testcases in blocks of statements and, although control of the conversation may reside at either the front-end or the back-end during execution of such a block of code, each new block is created by first considering which statement type is to be selected for selecting a statement to be added to the front-end.

A prediction is now made at step 240 of any changes of state that can be expected at the front-end or at the back-end. As noted above, use is made here of the fact that the changes of state brought about by execution of any legal statement are fully defined—each of the various commands leaves the local application in a state that is determined by the particular protocol rules. The testcase generator uses its knowledge of the predicted current states of both of the testcases and of the statements previously added to the testcases to predict the changes of state that will occur on execution of the newly added statements. In the transition to the new state various other commands may become legal whereas others become illegal.

The final step to be carried out by the statement generating subroutine is the addition (250) to the front-end testcase of self-checking code. Some aspects of the execution of the generated testcases can be checked immediately on execution of a particular statement. For example, certain statements cause a predictable change of state of the statement-issuing testcase immediately on execution of that statement. Certain other statements will lead to a state change later, when a data stream is subsequently received from the other end of the conversation.

In addition to checking the states of the testcases, it is possible to check the correct transfer of data, to check the commands which are put out, and to check the EIB flags which are set as a command is issued. In typical CICS interprogram conversations, each partner to the conversation only knows what statements have been issued at the far end by virtue of certain flags (the CICS EXEC interface control block flags) which are set as the data stream arrives. In the case of the random testcase generator which controls and therefore knows what commands are put out at both ends of the conversation, the flags are unnecessary to determine what commands have been issued, but a comparison of the flags and the issued statements which they should represent provides an error check.

Following completion of the statement-generating steps of a testcase generator subroutine, it is determined at step 150' whether enough statements have yet been added to the testcases. If the testcases are not sufficiently long (relative to an appropriate testcase length entered as initial control information at step 100'), then a random selection is made of a statement type for the next statement to be added to the front-end testcase (i.e., steps 120' onwards are repeated). Otherwise, a final block is added at each end to "free" the conversation. The two testcases are then stored for use in a later test run.

For each of the particular protocols, a single large subroutine is responsible for putting out interprogram conversation type commands, choosing from those that are legal in the current state. The principal function of the generator subroutine is to create a command for the local application (the front-end testcase) that is legal for the currently predicted state, but at the same time it is necessary to construct the remote application (the back-end testcase). Two testcases are thus created by the random testcase generator for each test run of the interprogram conversation aspects of the computer program under test. The local application is the one initially triggered by the CICS user, whereas the remote application will be brought to life by a command from the local application (the CONNECT PROCESS command).

Having considered in general the steps carried out by the testcase generator, it will be helpful now to consider examples of what is permissible in the different states. Initially the front-end testcase (which is the application program initially triggered by the CICS user) is in state 0. If the generator subroutine 200 which is responsible for putting out interprogram communication commands is called at this time, the only legal command that may be generated at step 210 is an ALLOCATE command (a CICS command used to acquire a session to a remote system). After a random example of this command has been added to the local testcase, the internal memory of the predicted state of the front-end testcase is altered to state 1-ALLOCATED (Col 3., FIG. 2).

When the generator subroutine is next called the only legal command which will advance the testcase beyond state 1 will be a CONNECT PROCESS (initiate a conversation) command. This will trigger into action a remote application which is the second testcase. The state of the conversation will then move on to the SEND state (state 2).

From now on in the generation, the element of randomness plays a greater part, since there are various possibilities in the SEND state—variations of the SEND command (some of which invite input from the remote application) and the CONVERSE command (i.e., send and wait for a reply). Every time a command is added to the local application, one or more matching commands may need to be added to the remote application. For example, if a straight SEND command is performed locally, a RECEIVE will be added to the remote testcase. Here there is scope for self-checking code. Random data will be passed on the SEND, and the remote RECEIVE will be followed by code to check that this data arrived correctly. Also, the resultant states will be self-checked.

Another example would be that the generator randomly chooses a SEND CONFIRM command for the local application (front-end testcase). This command (available only in sync levels 1 and 2) requests that the remote application sends confirmation that it has received the message—control will not be returned to the front-end application until it has received a message in response from the other end. At the remote end would be placed a RECEIVE. At run-time this RECEIVE would move the remote application into CONFIRM-RECEIVE state, where an ISSUE CONFIRMATION command, or perhaps an ISSUE ERROR, would be required. The generator will consequently add a random example of one of these into the remote application. Each of these ISSUE commands would have a different, but predictable, effect on the state of the local application following its SEND CONFIRM.

An example of conversational testcase code which could be generated by the testcase generation method of FIG. 4 will now be given. Suppose that the front-end testcase is currently predicted to be in SEND state and the back-end testcase is in RECEIVE state. The generator might randomly decide to create an interprogram communication statement. The subroutine responsible then chooses between the commands valid in the SEND state, in this example choosing a CONVERSE command. At testcase run-time this CONVERSE will cause a data stream to pass to the back-end, running in a separate computer system and will switch the front-end to state 5 (RECEIVE). A matching RECEIVE statement is added to the back-end testcase, followed by self-checking code to confirm that the data stream arrived correctly. This RECEIVE will switch the back-end to SEND state and a command valid in that state (in this case a pair of commands—a SEND followed by a SEND CONFIRM which is a command available at sync levels 1 and 2 requesting that the other testcase send confirmation that it has received a message) will be added to the back-end testcase. This will cause a data stream to be sent in the return direction. Finally, self-checking code is added to the front-end testcase. FIGS. 5 and 6 show some sample randomly generated code that reflects the above example, with explanatory comments in boxes and square brackets:

The front-end is now in CONFIRM-RECEIVE state. So, the next time this subroutine is called, a statement that is valid in that state will be generated. Again further matching code will be added to the back-end.

As stated previously, there are a maximum of fourteen different states (at sync level 2), offering various different legal commands. Each of these commands may affect the states of the local application and possibly the remote application. Some of the states in sync level 2 are concerned with syncpoints (where a record of the user's data is made in case there is a subsequent failure of some sort). The two applications must take a syncpoint simultaneously and this must be ensured by passing messages back and forth. The testcase generator of the preferred embodiment of the invention supports all of these commands and state transitions.

In the above example, the SEND and SEND CONFIRM commands issued the front-end of the conversation or the other would be joined together to form a single transmission. This is known as "piggy-backing". If that happens only a single RECEIVE will be required at the other end. In some situations it is possible for the random testcase generator according to the present invention to know for certain that piggy backing will occur. The generator can then place a single RECEIVE at the opposite end. Where the piggy-backing is in doubt, being time-dependent, the generator places at the other end a RECEIVE, followed by a test of certain flags in the CICS EXEC interface control block, followed by a second RECEIVE that will be executed only on certain settings of these flags. In this way, it is possible to completely predict the passage of control through both of the testcases in the conversation, without problems being caused by timing considerations.

It was noted in the above examples that a SEND CONFIRM command will not return control to the command-issuing testcase until a response has been received from the other end. This "hanging" of certain CICS commands until a response is received explains why control does not simply rip through one or both of the testcases, which are executing asynchronously in different CICS systems. The execution of both the local and the remote testcases proceeds in spurts, perhaps of several commands, between these commands which stop the particular testcase's control. Although it is not possible to predict the exact timing of these commands, it is possible to predict the interleaving of the spurts. At all stages the states of the conversation and the correct passing of data between the testcase programs may be automatically checked by the random testcase generator of the preferred embodiment of the present invention.

The data in a SEND may also be so long that several RECEIVE commands will be required at the other end. Self-checking is carried out here, by the testcase generator calculating how many RECEIVEs will be needed and self-checking that these commands do pull in all of the transmitted random data.

A further feature of the testcase generator of the present invention is that it may be set to deliberately put out bad commands to test the functions of CICS which deal with errors. When a bad command is issued, occurrence of the correct error indication specified by CICS may be self-checked.

Whilst the preferred embodiment of the present invention herein described in detail relates to testing the operation of intercommunicating CICS programs in distributed transaction processing, it is clear that the invention is not limited to either distributed transaction processing or to CICS online processing but has more general applicability to the testing of distributed computer systems in which different processors communicate with each other.

What is claimed is:

1. A method of generating testcase programs for a distributed computer system in which a conversation between partners in remote processors or regions at respective ends of said conversation employs interprogram conversation statements according to a predetermined protocol which also defines conversation states of said partners, each of said partners having a current conversation state, the method comprising the steps of:

(a) randomly generating an example of an interprogram conversation statement for one of said partners which is valid for the current conversation state of that partner;

(b) adding the randomly generated example of an interprogram conversation statement to a first testcase program for that partner;

(c) if any randomly generated statement for the first testcase program requires a matching statement at the other end of the conversation according to said protocol, randomly generating an example of an interprogram conversation statement for the other partner which is valid for the current conversation state of that partner;

(d) adding the matching statement to a second testcase program for the other partner; and (e) predicting for each generated interprogram conversation statement any changes of state to said partners that will occur on execution of the respective randomly generated examples of interprogram statements prior to generation of each such subsequent statement, whereby the validity of subsequent statements under said protocol can be predetermined.

2. A method as claimed in claim 1 for generating non-conversational program statements for testcase programs, including the steps of:

initially randomly selecting a type of program statement to be added to the testcase programs;

if the randomly selected type is an interprogram conversation type, carrying out steps (a) to (e);

if the randomly selected type is a nonconversational type, randomly generating an example of a nonconversational program statement; and adding the nonconversational program statement to the first testcase.

3. A method as claimed in claim 2 in which said steps of randomly selecting a type of program statement and randomly generating an example of a nonconversational program statement are repeated until a predetermined number of statements have been added to said testcase programs in response to operator input information.

4. A method as claimed in claim 2 including the step of weighting said step of randomly selecting a type of program statement to preferentially select the type and/or frequency of statements in response to operator input information.

5. A method as claimed claim 1 in which checking statements are added to said first and second testcase programs for checking for correct execution of the randomly generated examples of interprogram conversation statements.

6. A method as claimed in claim 1 in which interprogram conversation statements and conversation states may conform to a plurality of different protocols, the method comprising the additional step of initially selecting one of said plurality of different protocols in response to operator input information.

* * * * *